(12) United States Patent
Aboud

(10) Patent No.: US 12,523,844 B2
(45) Date of Patent: Jan. 13, 2026

(54) 360 DEGREE ROTATING MIRROR ASSEMBLY

(71) Applicant: ROSWELL CANADA INC., Acheson (CA)

(72) Inventor: Stephen D. Aboud, Cocoa Beach, FL (US)

(73) Assignee: ROSWELL CANADA INC., Acheson (CA)

( * ) Notice: Subject to any disclaimer, the term of this patent is extended or adjusted under 35 U.S.C. 154(b) by 387 days.

(21) Appl. No.: 18/120,521

(22) Filed: Mar. 13, 2023

(65) Prior Publication Data

US 2023/0288663 A1   Sep. 14, 2023

Related U.S. Application Data

(60) Provisional application No. 63/318,888, filed on Mar. 11, 2022.

(51) Int. Cl.
*G02B 7/182* (2021.01)
*B60R 1/04* (2006.01)

(52) U.S. Cl.
CPC .............. *G02B 7/1821* (2013.01); *B60R 1/04* (2013.01)

(58) Field of Classification Search
CPC ....................................................... B60R 1/04
See application file for complete search history.

(56) References Cited

U.S. PATENT DOCUMENTS

| | | | |
|---|---|---|---|
| 1,558,641 A * | 10/1925 | Short | B60R 1/04 D12/187 |
| 2,763,188 A * | 9/1956 | Bertell | B60R 1/04 248/484 |
| 4,614,412 A * | 9/1986 | Cohen | B60R 1/081 359/872 |
| 5,106,177 A * | 4/1992 | Dolasia | B60R 1/04 248/478 |
| 5,419,522 A | 5/1995 | Luecke et al. | |
| 7,028,959 B2 | 4/2006 | Schultz | |
| 8,770,530 B2 | 7/2014 | Bohanan et al. | |
| 8,960,629 B2 * | 2/2015 | Rizk | F16M 11/14 248/481 |
| 2014/0085739 A1 | 3/2014 | Bohanan et al. | |
| 2018/0001824 A1 | 1/2018 | Bohanan et al. | |
| 2019/0339484 A1 | 11/2019 | Lake et al. | |

* cited by examiner

*Primary Examiner* — Robert E. Tallman
(74) *Attorney, Agent, or Firm* — Timothy H. Van Dyke; Wolter Van Dyke Davis, Pllc

(57) ABSTRACT

An apparatus (100), including: a base assembly (302) configured to be secured to a windshield assembly; a mirror assembly (200); and a pivot arm (304) secured to the base assembly by a first pivot joint (306) and secured to the mirror assembly by a second pivot joint (202). The first pivot joint is configured to enable the pivot arm to rotate 360 degrees around a first pivot axis (310).

18 Claims, 8 Drawing Sheets

360 DEGREE ROTATING MIRROR ASSEMBLY

FIELD OF THE INVENTION

The invention relates to a mirror assembly having support assembly that adjustably positions the mirror assembly through a 360 degree range of positions.

BACKGROUND OF THE INVENTION

Mirror assemblies on vehicles typically provide a modest amount of position adjustment. In certain applications, more adjustment is beneficial. For example, for marine vessels engaged in certain watersports, such as waterskiing and wakeboarding, it is important to have a mirror in place that allows the operator to see a person engaged in the activity behind the vessel. The mirror can be moved out of the driver's line of sight once the activity is complete. Mirror assemblies for these applications often have a greater amount of positioning adjustment to provide this flexibility. The industry has provided the increased the positioning flexibility in a variety of ways, but there remains room for improvement.

BRIEF DESCRIPTION OF THE DRAWINGS

The invention is explained in the following description in view of the drawings that show.

DETAILED DESCRIPTION OF THE INVENTION

Figure 1:
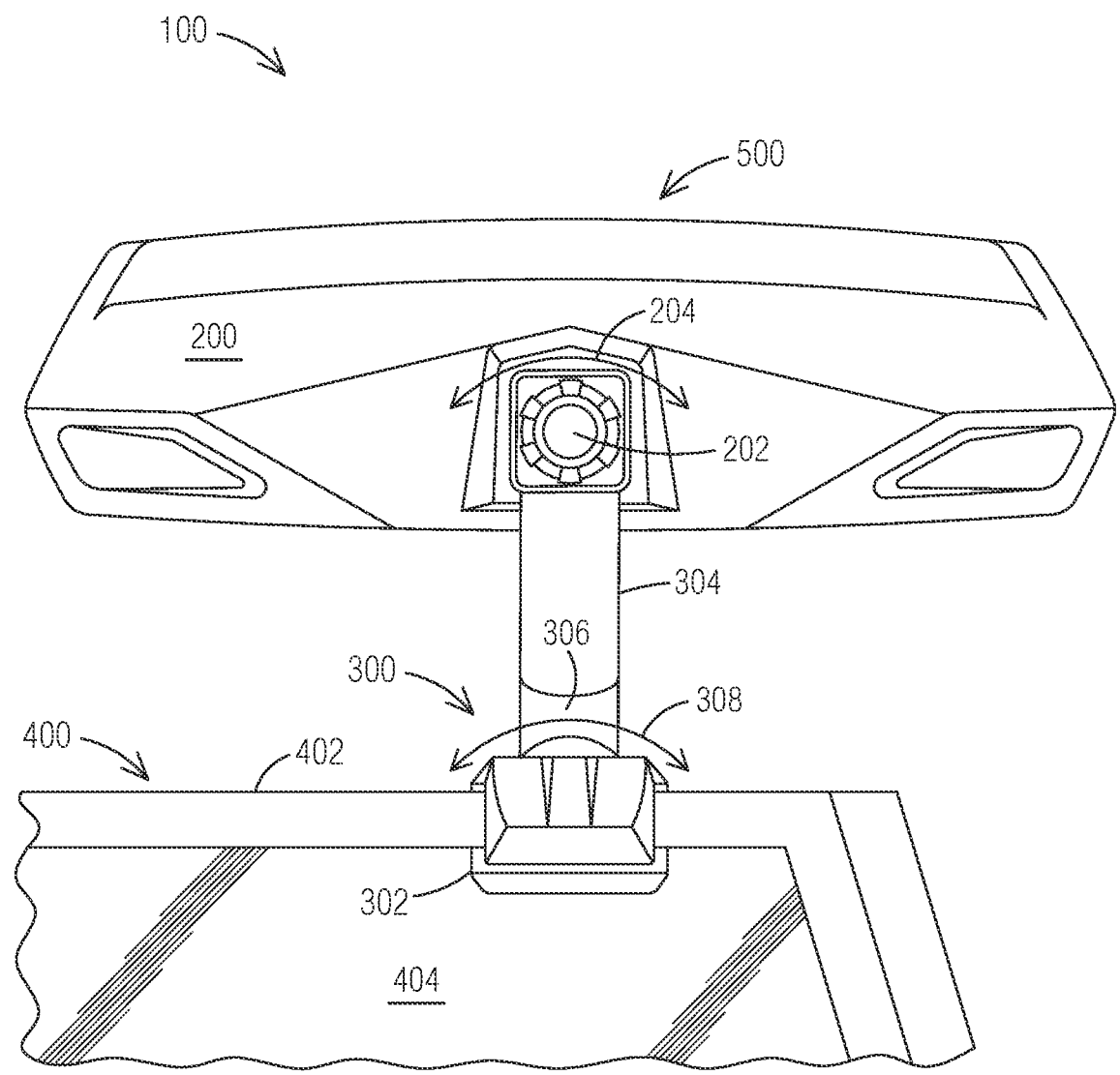
FIG. 1 shows an example embodiment of mirror apparatus having a mirror assembly and support assembly secured to a windshield assembly.

FIG. 1 shows an example embodiment of mirror apparatus 100 having a mirror assembly 200 and support assembly 300 secured to a windshield assembly 400. In the example embodiment shown, the support assembly 300 is secured to a frame 402 of the windshield assembly 400, although it is possible to secure the support assembly 300 to a windshield 404 or any other part of the windshield assembly 400.

The support assembly 300 generally includes a base assembly 302 configured to be secured to the windshield assembly 400 (e.g., a boat windshield, a recreational vehicle windshield), a pivot arm 304 which connects the base assembly 302 to the mirror assembly 200, a first pivot joint 306 that secures the base assembly 302 and the pivot arm 304 together and that allows the pivot arm 304 to rotate 308 about a first pivot axis 310, and a mirror adjustment mechanism 202 (e.g., a second pivot joint) that secures the mirror assembly 200 and the pivot arm 304 together and that allows the mirror assembly 200 to rotate 204 about a second pivot axis 206. While a clamping arrangement is shown, the base assembly 302 can be secured to the windshield assembly 400 via any suitable way known to the artisan, including via fasteners, suction cups, friction mounts, and/or various clamping mounts.

Figure 2:
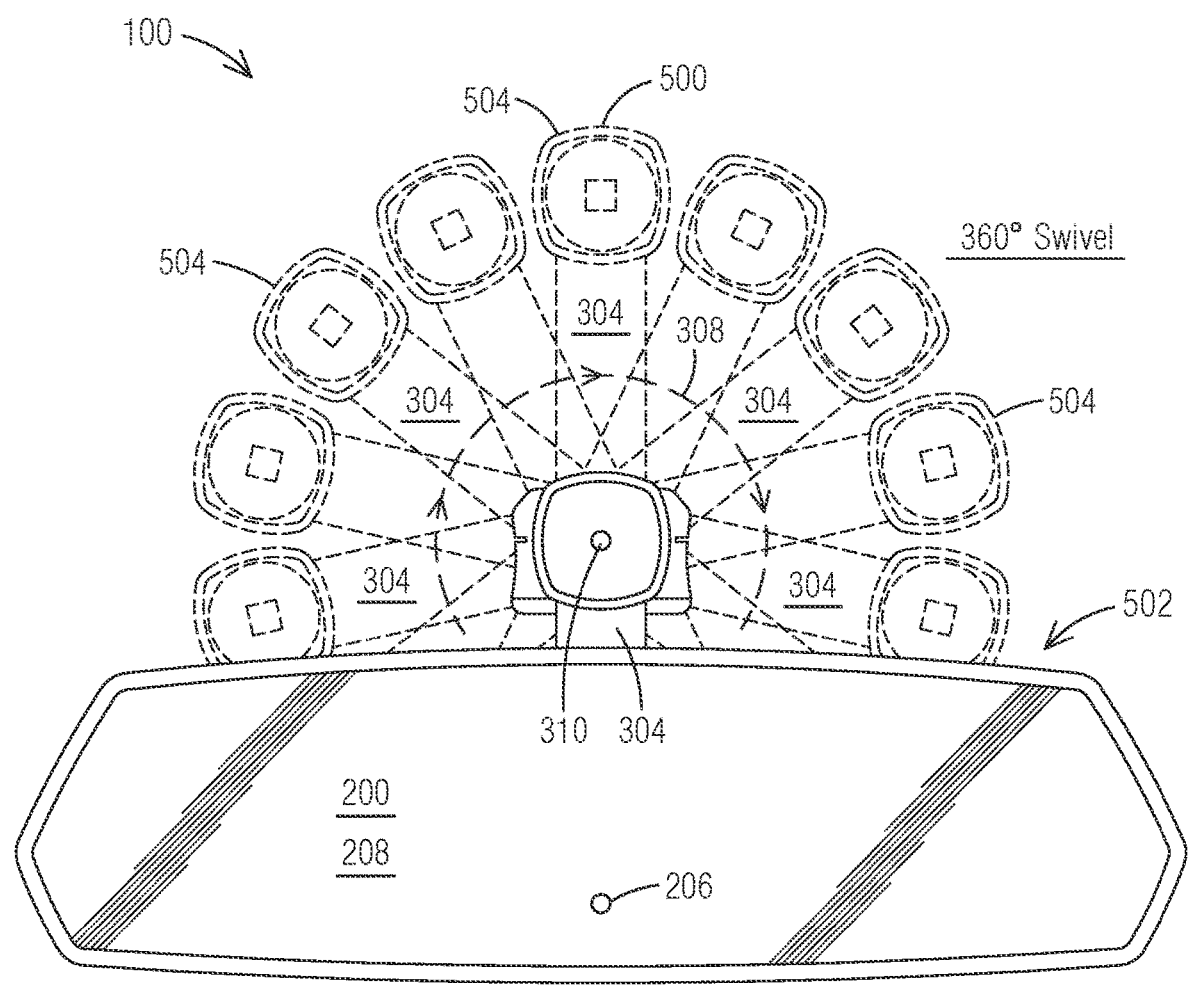
FIG. 2 to FIG. 6 show various views of the mirror apparatus of FIG. 1.
Figure 3:
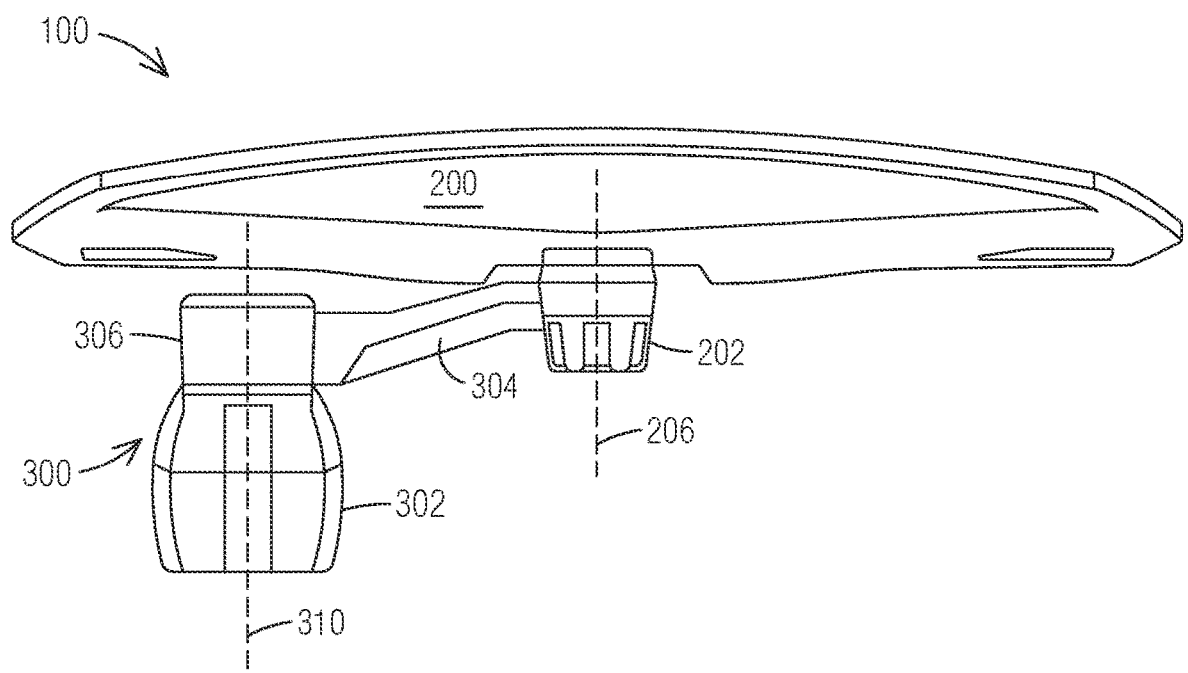
Figure 4:
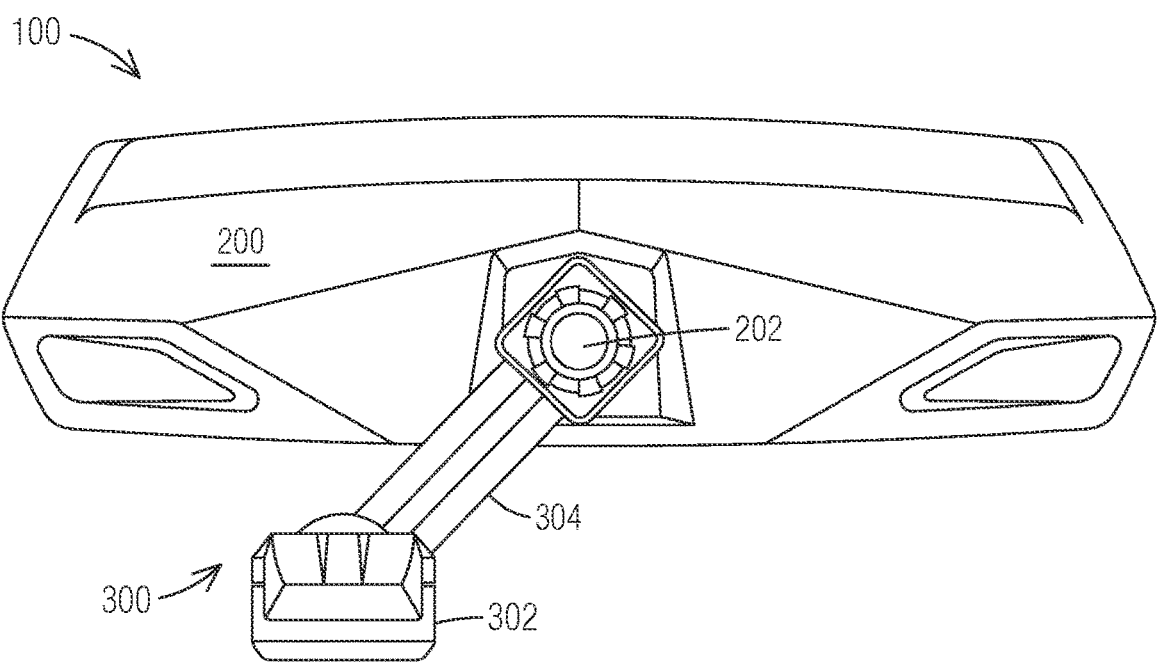
Figure 5:
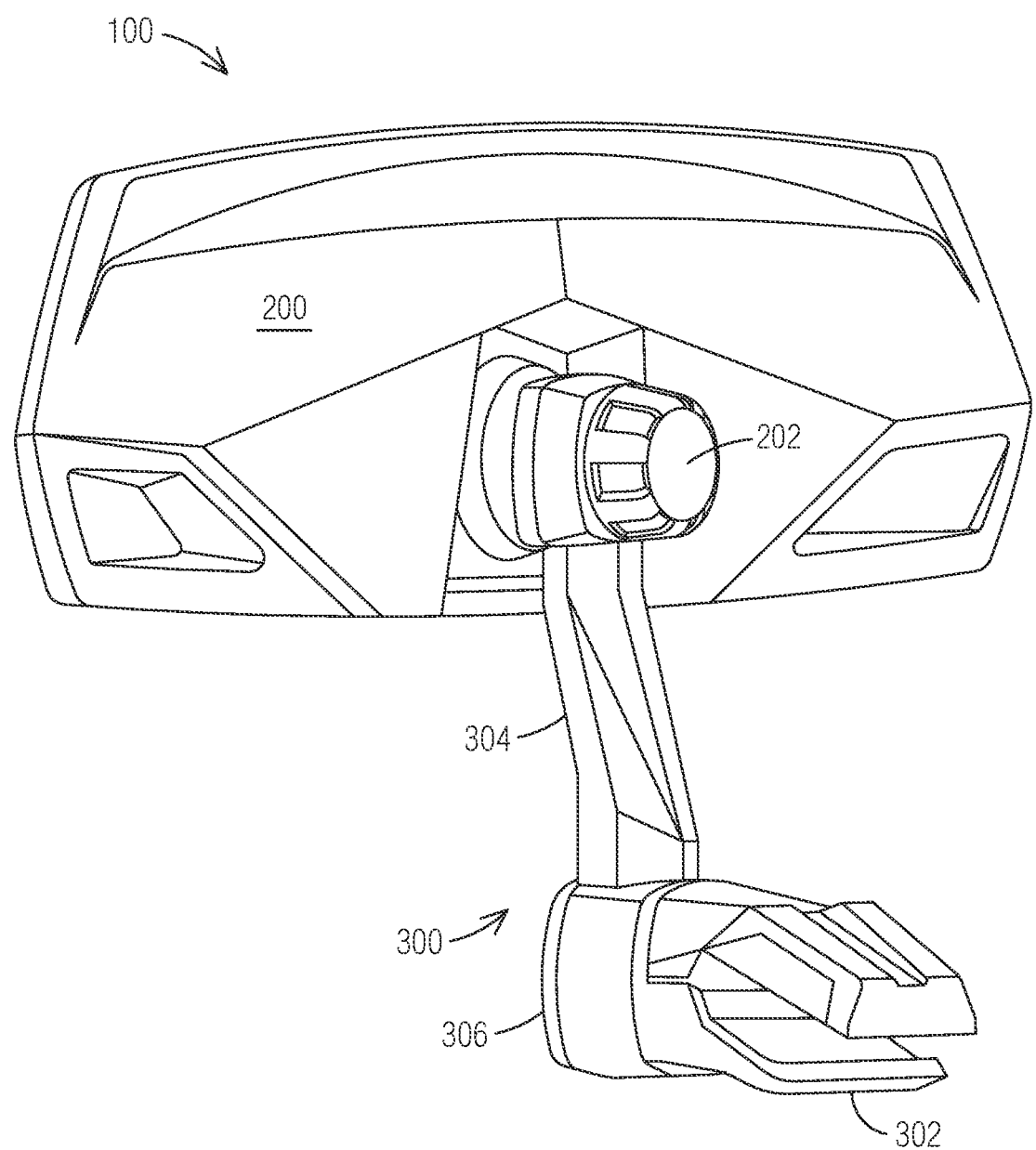
Figure 6:
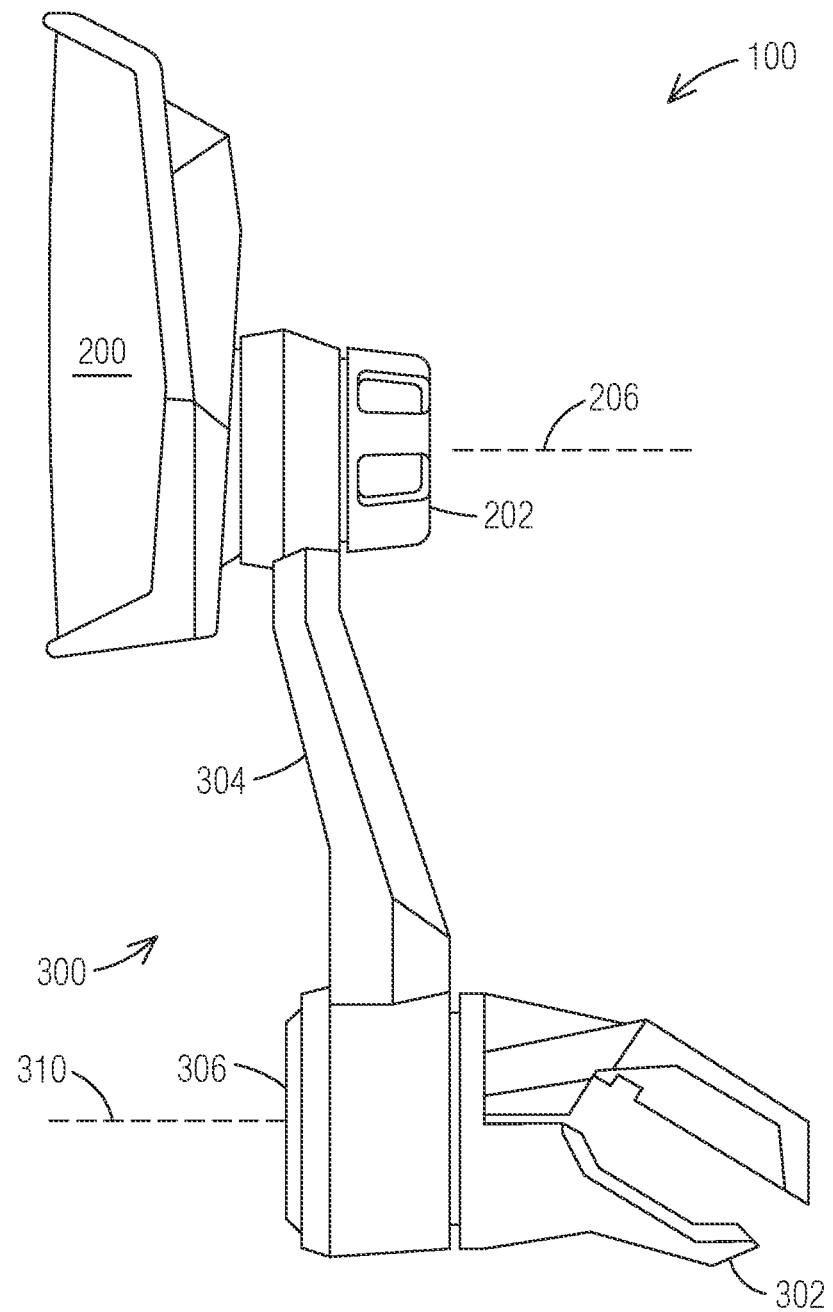

In FIG. 1, the pivot arm 304 is positioned vertically up, in the twelve o-clock position 500, which places the mirror assembly 200 at its highest position. The highest position and/or other relatively high positions may be, for example, associated with use of the mirror assembly 200, and the particular position chosen may be chosen not to block the operator's forward line of sight. In FIG. 2, the pivot arm 304 is positioned vertically down, in the six o'clock position 502, which places the mirror assembly 200 at its lowest position. The lowest position and/or other relatively low positions may be, for example, associated with storage of the mirror assembly 200. As can be seen in FIG. 2, the pivot arm 304 can be rotated 308 a full 360 degrees about the first pivot axis 310. Similarly, the mirror assembly 200 can be pivoted a full 360 degrees about the second pivot axis 206. The mirror assembly 200 can further be adjusted like a conventional rear-view mirror using the mirror adjustment mechanism 202.

The pivot arm 304 is moved simply by grabbing the mirror assembly 200 and manually moving (e.g., by applying external force to) the mirror assembly 200 and attached pivot arm 304 to the desired clocking position. Once the mirror assembly 200 and attached pivot arm 304 reach the desired clocking position 504, the user releases the mirror assembly 200. Once the mirror assembly 200 is released, the support assembly 300 holds the mirror assembly 200 in place in the desired clocking position 504. Since the mirror assembly 200 is free to pivot about the second pivot axis 206, the user has the option of holding the mirror assembly 200 so that it maintains a same orientation (e.g., rotates about the second pivot axis 206) while orbiting the first pivot axis 310. Alternately, the user may allow the mirror assembly 200 to change orientation (e.g., not rotate about the second pivot axis 206) while orbiting the first pivot axis 310. In all cases, the mirror 208 of the mirror assembly 200 always faces the same direction, regardless of the clocking position 504. As such, when the mirror apparatus 100 is secured to a windshield assembly 400, the first pivot axis will be oriented forward to rearward relative to the vessel, and the mirror 208 will always face rearward/aft, regardless of the clocking position 504 taken.

The manual manipulation of the position of the mirror assembly 200 and the attached pivot arm 304 (e.g., application of force thereto) is all that is needed to move the mirror assembly 200 and the attached pivot arm 304 to the desired clocking position 504. There are no mechanisms in the first pivot joint 306 that must be manually adjusted each time the mirror assembly 200 is to be moved from or secured into a locking position 504.

When the mirror adjustment mechanism 202 is adjusted to provide a high degree of friction which strongly resist rotation of the mirror assembly 200 about the second pivot axis 206, repositioning of the mirror assembly can be accomplished by rotating/orbiting the mirror assembly 200 about the first pivot axis 310 to the desired clocking position, by loosening the mirror adjustment mechanism 202 to rotate/orient the mirror assembly 202 about the second pivot axis 206 to the desired position/orientation, and if the original high degree of friction is desired, by retightening the mirror adjustment mechanism 202.

When the mirror adjustment mechanism 202 is adjusted to provide a lower degree of friction which permits rotation of the mirror assembly 200 about the second pivot axis 206, repositioning the mirror assembly 200 can be as simple as using one hand to orbit the mirror assembly 200 about the first pivot axis 310 and the same hand to position/orient the mirror assembly 200 as desired about the second pivot axis 206. In another one-handed example adjustment procedure, the operator may keep the mirror assembly 200 in a same orientation relative to the ground (e.g., horizontal) by holding the mirror assembly 200 in a particular orientation using only one hand while orbiting the mirror assembly 200 about the first pivot axis 310 using the same hand.

The repositioning process can be repeated as many times as is necessary to accommodate the various dynamic circumstances associated with boat operation. When only one hand is required to reposition the mirror assembly 200, the other hand is free to maintain control of the vessel, which provides for safer operation of the vessel.

In the example embodiment of FIG. 2, sixteen (16) discrete clocking positions 504 are shown. There may be more discrete locking positions and there may be fewer discrete locking positions in other example embodiments. Alternately, or in addition, the pivot arm 304 may be infinitely adjustable. For example, there may be no discrete clocking positions, in which case the pivot arm 304 can take and be held in any clocking position. Alternately, or in addition, there may be any number of discrete clocking positions, and the pivot arm 304 can take and be held in any clocking position between the discrete clocking positions. Any combination is within the scope of the disclosure.

Figures 7A, 7B:
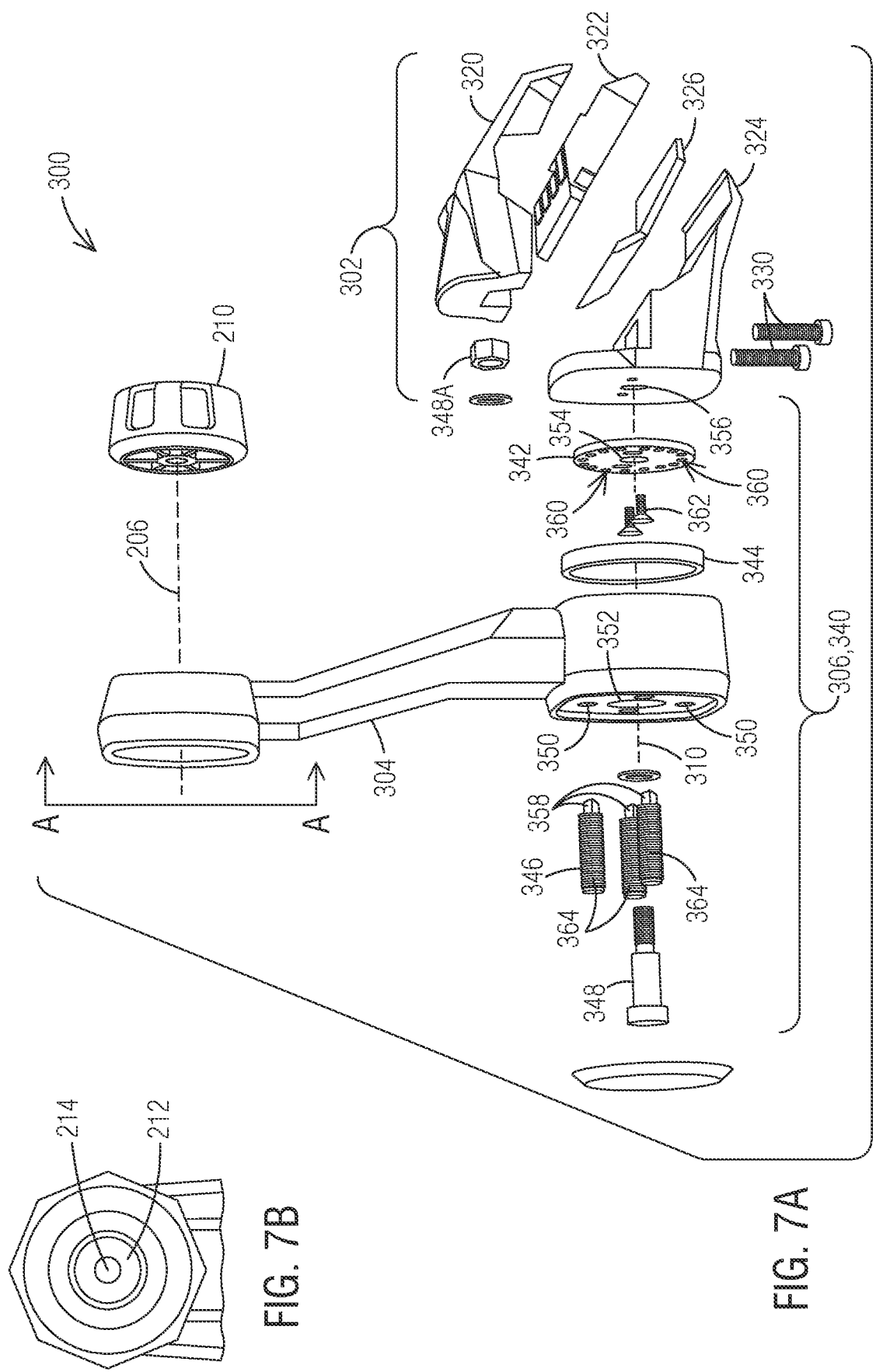
FIG. 7A is an exploded view of an example embodiment of a support assembly of the mirror apparatus of FIG. 1.
FIG. 7B is a view along A-A of FIG. 7A.

FIG. 7A is an exploded view of the support assembly 300 of the mirror apparatus 100, and FIG. 7B is taken along A-A of FIG. 7A. In this example embodiment, the base assembly 302 includes an upper base assembly piece 320, an upper base assembly insert 322 that fits into and geometrically interlocks with the upper base assembly piece 320, a lower base assembly piece 324, and a lower base assembly insert 326 that fits into and geometrically interlocks with the lower base assembly piece 324. The upper base assembly insert 322 and the lower base assembly insert 326 geometrically interlock with respective portions of the frame 402 while also protecting the frame 402 from being damaged by the base assembly 302. In this example embodiment, a geometric interlock between the upper base assembly insert 322 and the lower base assembly insert 326 and the frame 402 prevents the base assembly 302 from rotating around the frame 402 and is formed by at least some of the upper base assembly insert 322 and the lower base assembly insert 326 form fitting with the frame 402. However, a form fit is not necessary. Any suitable geometric interlock known to the artisan can be used.

The upper base assembly piece 320 and the lower base assembly piece 324 clamp onto the upper base assembly insert 322 and the lower base assembly insert 326 respectively, which in turn, clamp onto (sandwich therebetween) the frame 402. The upper base assembly piece 320 and the lower base assembly piece 324 are drawn together onto the frame 402 to produce this clamping in any suitable manner known to the artisan. In an example embodiment, threaded fasteners 330 are used to produce the clamping affect. The upper base assembly insert 322 and the lower base assembly insert 326 may be composed of a material that is sufficiently rigid to maintain the integrity of the clamping action while also being soft enough to prevent/mitigate damage to the frame 402. Suitable materials for the upper base assembly insert 322 and the lower base assembly insert 326 include plastic, rubber, and the like. The pivot arm 304, the upper base assembly piece 320, and the lower base assembly piece 324 can be made of aluminum, stainless steel, plastic, or any combination thereof.

In this example embodiment, the first pivot joint 306 includes a detent assembly 340 that includes a detent position plate 342, a compression washer 344, spring plungers 346, and a shoulder bolt 348. The spring plungers 346 are installed in spring plunger receptacles 350 in the pivot arm 304. The shoulder bolt 348 is installed through a pivot arm central opening 352 in the pivot arm 304, through a detent position plate central opening 354, and into a base assembly receptacle 356, which can be threaded or can hold a shoulder bolt nut 348A. Tightening the shoulder bolt 348 draws the pivot arm 304 onto the base assembly 302, thereby sandwiching the compression washer 344 and the detent position plate 342 between the pivot arm 304 and the base assembly 302. Since the spring plungers 346 are installed in and move with the pivot arm 304, tips 358 of the spring plungers 346 are drawn onto the detent position plate 342 when the pivot arm 304 is drawn onto the base assembly 302. The detent position plate 342 has detent positioning holes 360 disposed in an array about the detent position plate 342. The detent positioning holes 360 cooperate with the spring plungers 346 to hold the pivot arm 304 and the mirror assembly 200 in the discrete clocking positions 504. The detent position plate 342 may be secured to the base assembly 302 in any suitable manner, such as via detent plate screws 362. Alternately, the detent position plate 342 and/or detent positioning holes 360 may be integrated into the base assembly 302.

Specifically, the tips 358 of the spring plungers 346 yield inward against a bias of a spring (not visible) in the body 364 of the spring plunger 346. When the pivot arm 304 is in one of the clocking positions 504, the spring plungers 346 align with respective detent positioning holes 360. This alignment allows the tips to move outward under the bias of the spring in the body 364 of the spring plunger 346. Once the tips 358 protrude into the respective detent positioning holes 504 and remain there under the bias of the spring, a geometric interference between tip 358 and the respective detent positioning holes 504 resists circumferential movement of the pivot arm 304. The geometric interference is sufficient to hold the pivot arm 304 and mirror assembly 200 in the clocking position during operation of the vehicle/vessel. However, the geometric interference is selected to yield to manual manipulation of a user attempting to reposition the mirror assembly 200. In an example embodiment, the spring plungers 346 have a compressed tip/nose force of 14.5 pounds and an extended nose force of 5.5 pounds.

Since the spring plungers 346 are threaded, they can be adjusted in or out. This adjusts a minimum force that the tips 358 exert on the detent position plate 342 and associated forces necessary to reposition the mirror assembly 200. In addition, a sidewall of the detent positioning holes 360 may be tapered/ramped. This taper may guide the tip 358 into a respective clocking position 504 as the pivot arm 304 nears the respective clocking position. The taper may also provide increased but manually surmountable resistance to circumferential force/movement of the pivot arm 304 from a respective clocking position. Hence, the taper may encourage the pivot arm 304 into the respective clocking position 504 and resist movement of the pivot arm 304 from the respective clocking position 504. An angle of the taper may be varied to vary a magnitude of the effect of the taper. In between the detent positioning holes 360, the detent position plate 342 may be flat and smooth, and thereby offer a different resistance to the circumferential movement than the detent positioning holes 360 offer.

Consequently, an operator moving the pivot arm 304 and the mirror assembly 200 throughout 360 degrees of motion may experience varying levels of resistance during the motion. This includes a first level associated with the tips 358 being between the detent positioning holes 360, a second level as the tips extend and slide along the taper under the bias of their springs, which encourages the pivot arm 304 into the respective clocking position 504 (e.g., reduces resistance), and a third level as circumferential movement of the detent positioning holes 360 and associated tapers force the tips 358 to retract into the spring plunger 346 against the bias of the springs, which resists movement out of the respective clocking position 504 (e.g., increases resistance).

In an example embodiment, the compression washer 344, which offers resistance to the tightening of the shoulder bolt 348, and which provides friction to aid in the positioning of the pivot arm 304, may also act as a seal to partly or completely keep water out of at least the detent position plate 342 and the tips 358 of the spring plungers 346 of the detent assembly 340.

The mirror adjustment mechanism 202 includes a mirror adjustment knob 210 that can be adjusted to adjust a tightness of the mirror adjustment mechanism 202, a pivot arm concave surface 212 configured to cooperate with the mirror assembly 200 to enable positioning of the mirror assembly 200, and a mirror mount hole 214.

Figure 8:
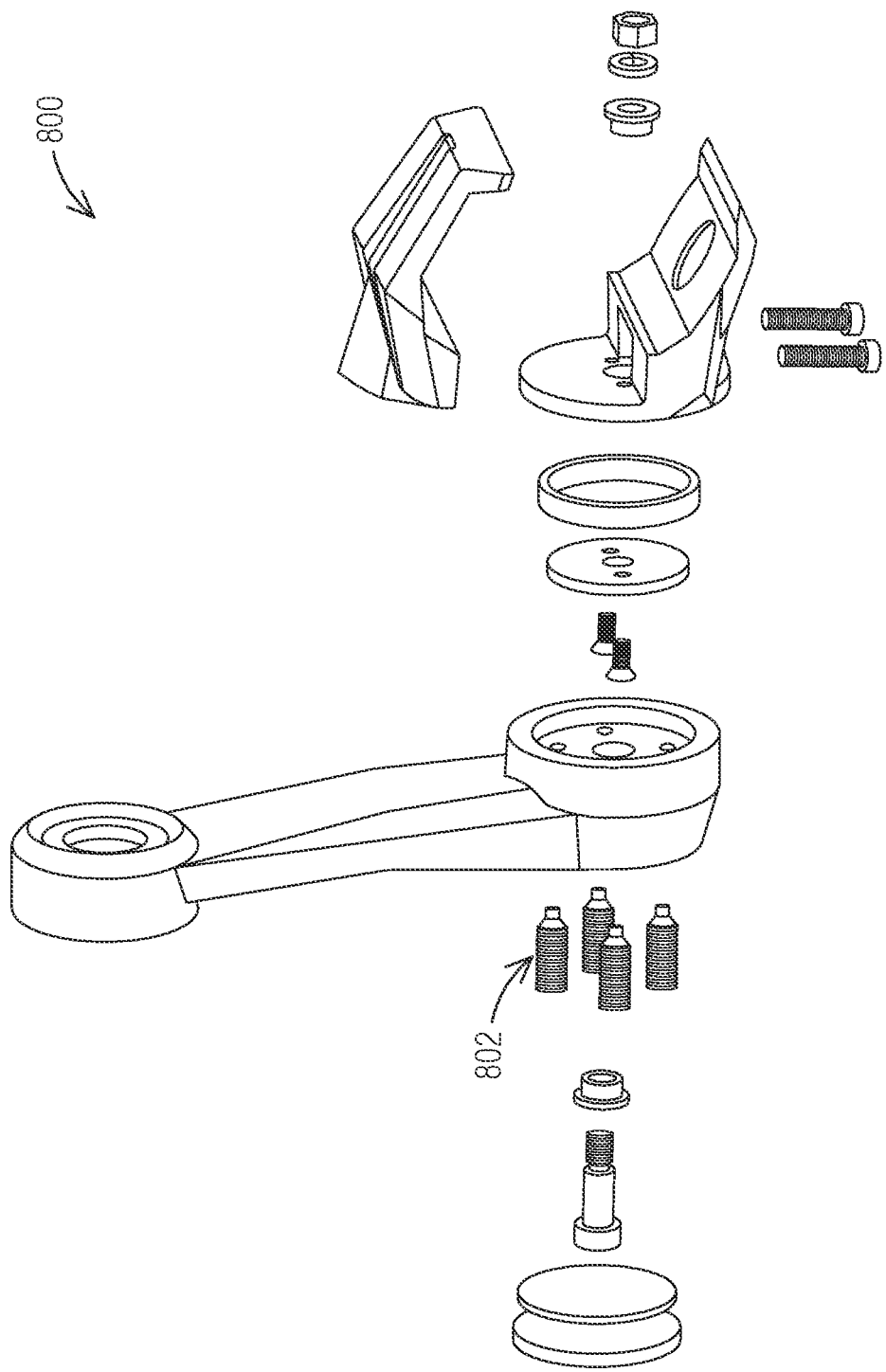
FIG. 8 is an exploded view of an alternate example embodiment of the support assembly.

FIG. 8 is an exploded view of an alternate example embodiment of the support assembly 800. This support assembly 800 is of a similar construction as the support assembly 300 of FIG. 7. However, this support assembly 800 uses four (4) spring plungers 802 instead of three. Any number of spring plungers 802 may be used. In addition, there are no inserts in the example embodiment of FIG. 8.

Figure 9:
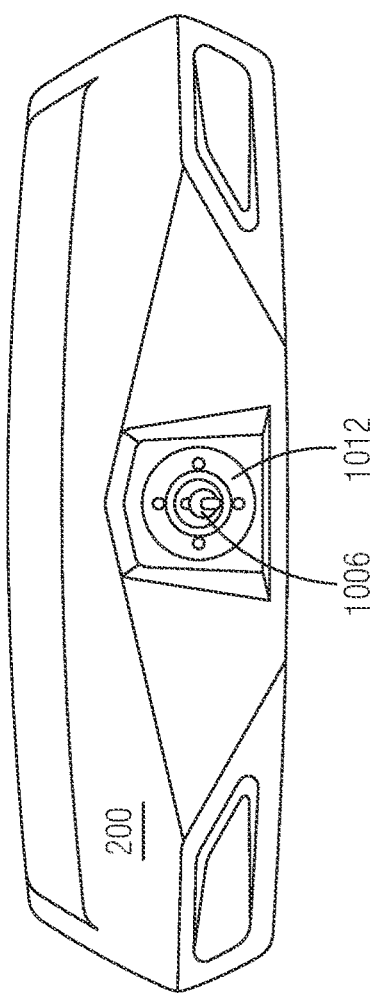
FIG. 9 is a rear view of an example embodiment of a mirror assembly of the mirror apparatus of FIG. 1.
Figure 10:
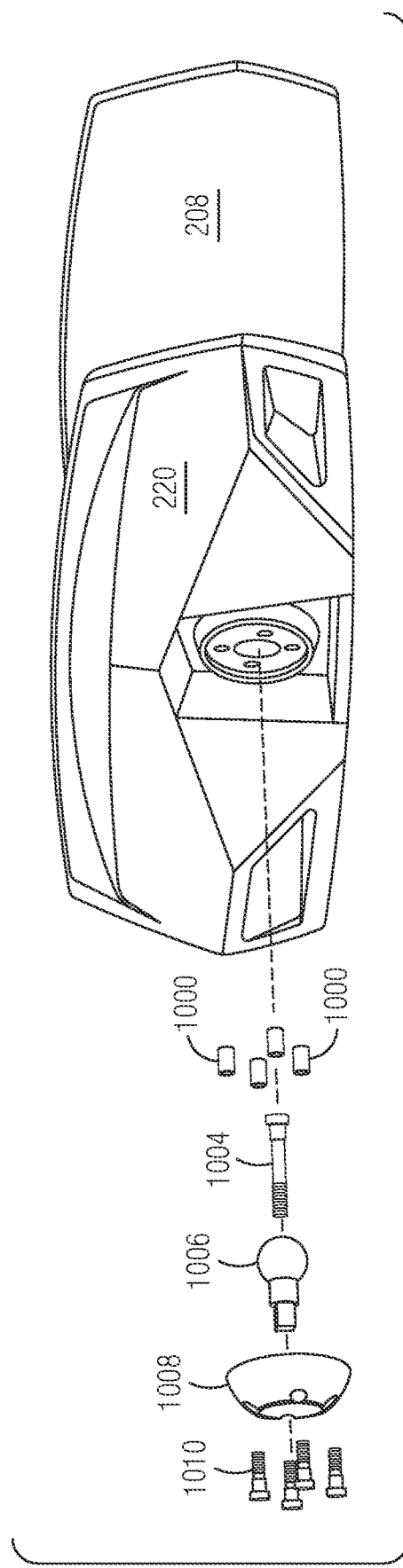
FIG. 10 is an exploded view of the mirror assembly of FIG. 9.

FIG. 9 and FIG. 10 show a mirror assembly 200 and elements of the mirror adjustment mechanism 202. In the example embodiment shown, inserts 1000 are installed in a mirror housing 220 of the mirror assembly 200. A mirror stud 1004 is installed in a swivel 1006 (e.g., a ball joint). The swivel 1006 is, in turn, installed in a swivel lock 1008. Mirror fasteners 1010 are installed in the inserts 1000 through the swivel lock 1008, thereby trapping the swivel 1006 in the swivel lock 1008, and the mirror stud 1004 in the swivel 1006. The mirror fasteners 1010 can be tightened as desired to create a desired amount of friction. This enables adjustment of the mirror assembly 200 via manual manipulation while retaining the mirror assembly 200 in a secure position relative to the pivot arm 304 during operation. The mirror stud 1004 is installed in the mirror mount hole 214 in the pivot arm 304 and likewise tightened to the desired degree by adjusting the mirror adjustment nut 440. A convex mirror assembly surface 1012 cooperates with the pivot arm concave surface 212 to enable rotation of the mirror assembly 200 relative to the pivot arm 304.

The mirror apparatus enables an operator to move the mirror assembly a full 360 degrees using only one hand and holds the mirror assembly in position once the operator releases it. This enables the operator to move the mirror assembly into and out of position with one hand while maintaining positive control of the vessel with the other hand. Consequently, the mirror apparatus represents an improvement in the art.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. An apparatus, comprising:
a base assembly configured to be secured to a windshield assembly;
a mirror assembly;
a pivot arm secured to the base assembly by a first pivot joint and secured to the mirror assembly by a second pivot joint;
wherein the first pivot joint is configured to enable the pivot arm to rotate 360 degrees around a first pivot axis; and
wherein the first pivot joint comprises a detent assembly configured to selectively hold the pivot arm in a plurality of clocking positions about the first pivot axis.

2. The apparatus of claim 1, wherein when the base assembly is secured to the windshield assembly, the first pivot axis is oriented forward to rearward relative to a vehicle to which the windshield assembly is mounted.

3. The apparatus of claim 1, wherein when the base assembly is secured to the windshield assembly, a mirror of the mirror assembly faces rearward regardless of a position of the mirror assembly about the first pivot axis.

4. The apparatus of claim 1, wherein the plurality of clocking positions comprises at least four clocking positions.

5. The apparatus of claim 1, wherein the detent assembly comprises an adjustable detent assembly configured to selectively adjust an amount of force required to move the pivot arm out of a clocking position of the plurality of clocking positions.

6. The apparatus of claim 5, wherein the adjustable detent assembly comprises an adjustment bolt and a compression washer that resists compression when the adjustment bolt is tightened.

7. The apparatus of claim 6, wherein the compression washer is disposed between the base assembly and the pivot arm and is configured to provide a water-resistant barrier for the detent assembly.

8. The apparatus of claim 1, wherein the second pivot joint comprises a ball joint.

9. The apparatus of claim 1, wherein the base assembly comprises a clamp assembly configured to clamp onto an edge of the windshield assembly.

10. The apparatus of claim 9, wherein the clamp assembly comprises: an outer clamp assembly; and an insert configured to fit in the outer clamp assembly and to clamp onto the edge of the windshield assembly in a form fit.

11. An apparatus, comprising:
a base assembly configured to be secured to a windshield assembly;
a mirror assembly comprising a mirror; and
a pivot arm secured to the base assembly by a first pivot joint and secured to the mirror assembly by a second pivot joint;
wherein the first pivot joint is configured to enable the pivot arm to be rotated about a first pivot axis solely by applying force to the pivot arm;

wherein the first pivot joint is configured to: permit rotation of the pivot arm about the first pivot axis; to provide resistance to the rotation; and to vary a magnitude of the resistance to the rotation throughout the rotation; and wherein when the mirror assembly is secured to the windshield assembly, the mirror faces rearward regardless of a clocking position of the pivot arm around the first pivot axis.

12. The apparatus of claim 11, wherein the first pivot joint is configured to vary the magnitude of the resistance by reducing the magnitude of the resistance for movement toward select clocking positions and increasing the magnitude of the resistance to movement from the select clocking positions.

13. The apparatus of claim 11, wherein the first pivot joint comprises a detent assembly configured to vary the resistance to the rotation.

14. The apparatus of claim 13, wherein the detent assembly comprises an adjustable detent assembly configured to provide a minimum resistance to the rotation, wherein the minimum resistance is adjustable.

15. The apparatus of claim 11, wherein the first pivot joint is configured to permit rotation of the pivot arm 360 degrees about the first pivot axis.

16. An apparatus, comprising:
a base assembly configured to be secured to a windshield assembly;
a mirror assembly;
a pivot arm secured to the base assembly by a first pivot joint and secured to the mirror assembly by a second pivot joint;

wherein the first pivot joint is configured: to enable the pivot arm to be rotated 360 degrees about a first pivot axis via an application of an external force to the pivot arm; to hold the pivot arm in place upon release of the external force; and to be free of any manually adjusted components that must be adjusted each time to permit the pivot arm is to be rotated or to be held in place; and wherein when the mirror assembly is secured to the windshield assembly, the mirror faces rearward regardless of a clocking position of the pivot arm around the first pivot axis; and wherein the first pivot point is further configured to provide resistance to the rotation and to vary a magnitude of the resistance to the rotation throughout the rotation.

17. The apparatus of claim 16, wherein the first pivot joint comprises a detent assembly configured to vary the resistance to the rotation.

18. An apparatus, comprising:
a base assembly configured to be secured to a windshield assembly;
a mirror assembly;
a pivot arm secured to the base assembly by a first pivot joint and secured to the mirror assembly by a second pivot joint;
wherein the first pivot joint is configured to enable the pivot arm to rotate 360 degrees around a first pivot axis; and
wherein the base assembly comprises a clamp assembly configured to clamp onto an edge of the windshield assembly.

* * * * *